L. VAN ORDEN.
SALIVA EJECTOR.
APPLICATION FILED OCT. 6, 1913.
1,155,020.
Patented Sept. 28, 1915.
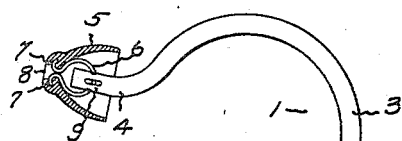
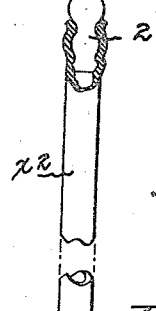
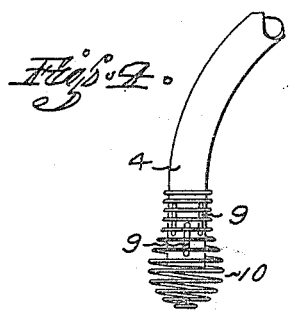
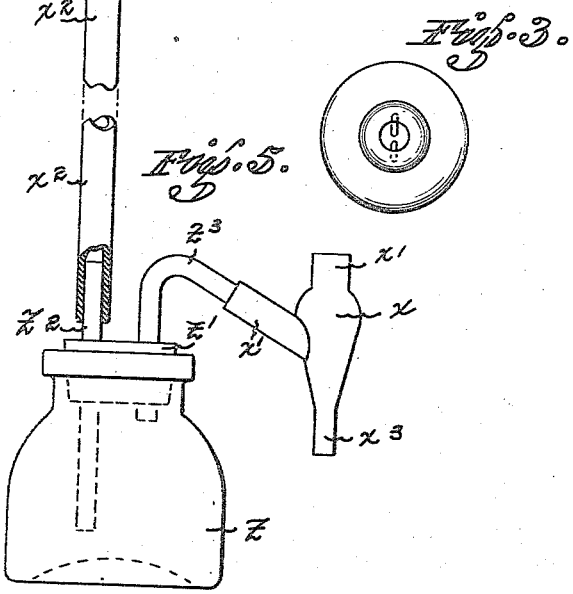
WITNESSES:
O. B. Vale
V. D. Vale
INVENTOR.
Leander Van Orden
BY Baldwin Vale
ATTORNEY

UNITED STATES PATENT OFFICE.

LEANDER VAN ORDEN, OF ALAMEDA, CALIFORNIA.

SALIVA-EJECTOR.

1,155,020.     Specification of Letters Patent.     Patented Sept. 28, 1915.

Application filed October 6, 1913. Serial No. 733,726.

*To all whom it may concern:*

Be it known that I, LEANDER VAN ORDEN, a citizen of the United States, residing in the city and county of Alameda, State of California, have invented certain new and useful Improvements in Saliva-Ejectors; and I do hereby declare the following to be a clear, full, and exact description of the said invention, such as will enable others skilled in the art to which it most nearly appertains to make, use, and practise the same.

Among the objects sought to be accomplished are, to provide a guard for the suction end of dental siphons, that will be comfortable to the patient, and prevent the stoppage of the siphoning by the tongue, mucous membrane or particles of fillings and the like in the mouth of the patient.

The invention possesses other advantageous features, that with the foregoing will be set forth at length in the following description, wherein I shall outline in full that form of the invention selected for illustration in the drawings accompanying and forming part of the present specification.

The novelty of the invention will be included in the claims succeeding said specification. From this it is apparent that I do not restrict myself to the showing made by said drawings and specification; as I may adopt many variations within the spirit of this invention, as expressed in said claims.

In the drawings: Figure 1 is a side elevation of a dental siphon having a guard hood applied to the mouth piece thereof, in accordance with this invention, the hood being shown in cross section, better to disclose its relation to the end of the siphon. Fig. 2 is an enlarged detail in side elevation of the end of the siphon mouthpiece, showing the guard hood applied thereto in the preferred manner, the hood being shown in vertical cross section. Fig. 3 is a front end view of the hood and the clip for attaching it to the siphon. Fig. 4 is an enlarged detail in side elevation of the end of the siphon tube, having a modified form of guard applied thereto, consisting of a spirally wound wire cage of suitable contour. Fig. 5 is a side elevation of a liquid trap for retaining obstructive matter that may pass through the siphon. This trap is adapted to be interposed between the siphon and the ejector. This figure is to be read in connection with Fig. 1.

In dental operations involuntary secretions of saliva accumulate in the mouth of the patient, to his discomfort, and to the annoyance of the operator; particularly when it is necessary to keep the portion of the mouth under treatment, dry and asceptic. Siphoning is depended upon to remove the accumulations of saliva, etc. Great difficulty is experienced in keeping the siphon working freely, owing to the tendency of the contiguous membrane to draw into or over the openings in the end of the siphon. Application of this invention to the siphon, eliminates the above disadvantages, and insures a free flowing discharge through the siphon, from the inlet within the patient's mouth to the outlet that is lower than the inlet, to cause the proper siphon action.

*Construction.*—In detail the preferred construction consists of the siphon 1, having the hose connection 2, attachable to the suction side of the ejector X, of any suitable type. The neck 3 of the siphon is bent to hang over the lower jaw of the patient, so that the suction end 4, will rest within the mouth behind the teeth, or in the jowl between the jaw and the cheek, or wherever saliva accumulates.

The guard preferably consists of a hood 5, of soft, flexible rubber that will rest gently upon the sensitive flesh of the patient, with the least discomfort to him. To permit the hood better to adjust itself to the contour of the mouth, it is preferably swiveled to the end of the siphon, so as to have a limited lateral movement, for greater comfort. This swiveling is most simply accomplished by the wire clip 6, bent into a ring and inserted through a hole provided near the end of the siphon. The ends of the clip are bent back upon themselves to form the hooks 7—7. engaging a recess formed in the end of the hood, adjacent to the center opening 8, therethrough. The hood may be otherwise swiveled or attached to the end of the siphon, without departing from the spirit of this invention. The clip is allowed sufficient play in the hole to permit easy freedom in all directions, without uncovering the end of the siphon.

It is the function of the hood 5 to shield or guard the opening in the end of the siphon, or the holes or slots 9—9 therein, from becoming clogged by the tongue or mucous membrane, cotton or other obstructive matter that may be in the mouth of the patient.

One of the primary advantages of this invention is that it permits a free and unobstructed end opening in the mouth piece of the siphon, giving a direct discharge through the siphon. The lateral openings 9, serve the double function of ingress to the siphon, and serve to break the vacuum that would otherwise form behind the end opening when closed by any obstruction.

Soft rubber (vulcanized) is best adapted for the substance of the hood, because of its softness yielding to the shape and movements of the patient's mouth, cleanliness and other obvious advantage.

The modified guard shown in Fig. 4, consists of a single piece of wire helically wound to form an open cage like flexible hood, adapted to be fastened over the end of the siphon, to perform the same function as the other form of hood above described. The wire should be non corrosive, light and springy to act as a flexible cushion for the end of the siphon, resting in the mouth of the patient.

The siphons may be variously formed, to fit peculiar anatomical conditions of the mouth. The guard will work equally well whether the end of the siphon is horizontal as in Fig. 1, or vertical as in Fig. 4.

*Operation.*—This invention operates substantially as follows: The pressure end $X^1$, of the ejector is attached to the water or air pressure supply, the flow of which causes a suction in the suction pipe $X^2$, attached to the siphon. The siphon is placed in the mouth of the patient; the shape and the placing of the siphon is determined by the operator according to circumstances. The suction force exerted by the ejector causes the accumulation of saliva to flow through the siphon, through the suction pipe, and away through the waste pipe $X^3$. The hood guard performing its function as previously described.

Unless the patient's mouth is too tender, the siphon operates better if a weight is hung on the suction pipe, this weight causes the submergence of the guarded end of the siphon, in the accumulated saliva in the patient's mouth, insuring a more continuous discharge. For this weight I prefer to use the bottle Z, with the stopper $Z^1$, through which the tube $Z^2$, extends from near the bottom thereof, and is connected with the suction pipe. The outlet tube $Z^3$, extends into the bottle and is connected with the suction side of the ejector. It is the function of this bottle to act as a trap, for retaining particles of fillings, broken tooth structure and the like, sucked up by the siphon. By trapping such obstructive matter, it is prevented from lodging in the ejector, or the waste pipe and causing stoppage of the flow therethrough; this trap also saves valuable gold particles in removing or grinding gold fillings.

Having thus described this invention, what is claimed and desired to secure by Letters Patent is:

1. In a saliva ejector, a siphon, a flexible guard attached to the suction end of said siphon.

2. In a saliva ejector, a siphon, a guard swiveled to the suction end of said siphon.

3. In a saliva ejector, a siphon having a laterally perforated suction end, a flexible guard attached to said siphon and inclosing the said perforated end.

4. In a saliva ejector, a siphon having a laterally perforated suction end, a clip extending through said perforation, and a flexible hood engaging said clip and inclosing the suction end of said siphon.

5. In a saliva ejector, a siphon having a laterally perforated suction end, a clip extending through said perforation, a hood of flexible material having a center opening, and a recess adjacent to said opening engaging said clip.

In testimony whereof, I have hereunto set my hand this 18th day of September 1913.

LEANDER VAN ORDEN.

Witnesses:
 BALDWIN VALE,
 O. B. VALE.